(12) United States Patent
Gaucas et al.

(10) Patent No.: US 8,745,075 B2
(45) Date of Patent: Jun. 3, 2014

(54) NOTIFICATION METHOD FOR A DYNAMIC DOCUMENT SYSTEM

(75) Inventors: Dale Ellen Gaucas, Rochester, NY (US); Scott David Weber, Canandaigua, NY (US)

(73) Assignee: Xerox Corporation, Norwalk, CT (US)

( * ) Notice: Subject to any disclaimer, the term of this patent is extended or adjusted under 35 U.S.C. 154(b) by 1566 days.

(21) Appl. No.: 11/690,961

(22) Filed: Mar. 26, 2007

(65) Prior Publication Data

US 2008/0243807 A1 Oct. 2, 2008

(51) Int. Cl.
*G06F 7/00* (2006.01)
*G06F 17/30* (2006.01)

(52) U.S. Cl.
USPC .......................................................... 707/759

(58) Field of Classification Search
USPC ................... 707/999.2, 779, 759, 999.004
See application file for complete search history.

(56) References Cited

U.S. PATENT DOCUMENTS

| | | | |
|---|---|---|---|
| 6,006,242 A | | 12/1999 | Poole et al. |
| 6,338,149 B1 * | | 1/2002 | Ciccone et al. ............ 714/38.12 |
| 6,640,240 B1 * | | 10/2003 | Hoffman et al. ............... 709/203 |
| 6,915,299 B1 * | | 7/2005 | Arcuri et al. ........................ 1/1 |
| 6,934,720 B1 * | | 8/2005 | Jacobs et al. ................... 707/200 |
| 6,941,510 B1 | | 9/2005 | Ozzie et al. |
| 7,065,500 B2 | | 6/2006 | Singh et al. |
| 7,107,525 B2 | | 9/2006 | Purvis |
| 7,127,674 B1 | | 10/2006 | Carroll et al. |
| 7,877,474 B2 * | | 1/2011 | Lainer et al. .................. 709/224 |
| 2002/0103809 A1 * | | 8/2002 | Starzl et al. .................... 707/102 |
| 2002/0184233 A1 * | | 12/2002 | Schneider .................. 707/104.1 |
| 2003/0158839 A1 * | | 8/2003 | Faybishenko et al. ............ 707/3 |
| 2004/0015476 A1 * | | 1/2004 | Twaddle ............................ 707/1 |
| 2005/0044491 A1 * | | 2/2005 | Peterson ....................... 715/517 |
| 2006/0031379 A1 * | | 2/2006 | Kasriel et al. .................. 709/213 |
| 2007/0041035 A1 * | | 2/2007 | Sembower et al. .......... 358/1.15 |
| 2009/0150518 A1 * | | 6/2009 | Lewin et al. ................... 709/219 |

OTHER PUBLICATIONS

Jason Diamond, "Template Languages in XSLT", 2002, available online: http://www.xml.com/lpt/a/943.*
Anders Kristensen, "Template Resolution in XML/HTML", 1999.*

* cited by examiner

*Primary Examiner* — Brannon W Smith
(74) *Attorney, Agent, or Firm* — Fox Rothschild LLP

(57) ABSTRACT

A dynamic document template contains a set of queries. Each query may include a query scope. The query scope may refer to a content of a source document that is maintained in a document collection. A content rule is applied to monitor the template for a change. A notification event is triggered when a change to the document collection results in an invalid query scope in the template. A notification event may also be triggered when a change to the document collection results in valid query but the template needs to be refreshed. An additional notification event may be triggered if the template is modified so that the resulting template is either invalid or needs to be refreshed with different content from the collection.

17 Claims, 5 Drawing Sheets

```
<proposal>
  <title>Content Workflows</title>
  <description>This project proposes to use work practice
      study capabilities to explore content driven workflows.
  </description>
  <customers>The DocuShare business unit.</customers>
  <staffing>
    <cpxquery href="http://cooper.wcrt.xeroxlabs.com:8280/
        docushare">
      <cpxscope>Collection-20</cpxscope>
      <cpxcontext>name</cpxcontext>
    </cpxquery>
  </staffing>
    <cpxquery href="cooper.wcrt.xeroxlabs.com:8280/docu
        share">
      <cpxscope>Document-34</cpxscope>
      <cpxcontext>mission</cpxcontext>
    </cpxquery>
</proposal>
```

NOTIFICATION METHOD FOR A DYNAMIC DOCUMENT SYSTEM

BACKGROUND

Various methods of dynamically creating a document are known in the art. U.S. Pat. No. 6,006,242, the disclosure of which is incorporated herein by reference, discusses creating an electronic document by reading a document and matching associated entity identifiers. However, this method does not have a notification event mechanism for dynamic documents.

The use of a notification event is also well known. A notification event can occur when a certain condition is satisfied. U.S. Pat. No. 7,065,500, the disclosure of which is incorporated herein by reference, discusses a notification method in a database system. The database owner may specify notification criteria associated with a search listing and the system may monitor for the notification event. If the system detects a changed condition of the search listing, then a notification event is created. However, this notification event is only associated with changes to specific documents, and not with changes to dynamic documents.

The disclosure contained herein describes the methods of resolving one or more of the problems discussed above.

SUMMARY

In an embodiment, a document creation method includes maintaining a dynamic document template containing a plurality of queries. Each query includes a query scope and a context element, wherein the query scope refers to content of one or more source documents maintained in a document collection. The method includes applying a content rule to monitor the document collection and trigger an action if a change occurs to any of the source documents. When a change occurs to the any of the source documents, the method includes determining the validity of each of the queries in the document template. If any of the queries are invalid after the change, notifying a user of an invalid query scope. In all queries are valid after the change, the method may include notifying the user that the document template should be refreshed, or it may automatically refresh the document template.

Refreshing the document template may include displaying a dynamic document comprising at least a portion of the dynamic document template with the content of the one or more source documents, including the changed source document. Notifying a user may include identifying a user who selected the content rule and delivering a notification to the user who selected the content rule.

In an embodiment, each query in the template includes a query scope and a context element. Each query scope refers to content of a source document that is maintained in a document collection. The method may receive a change to one of the queries to result in a modified query, and it may automatically access the document collection to determine whether the modified query is valid. If the modified query is invalid, a first template refresh notification event may be triggered. For example, a user may be notified that the document template or a query within it may be invalid. Alternatively, if the modified query is valid, a second notification event may be triggered, such as notifying a user to refresh the dynamic document template to obtain an updated view of the dynamic document.

BRIEF DESCRIPTION OF THE DRAWINGS

FIG. 1 discloses one embodiment of a dynamic document template.

FIG. 3 depicts one embodiment of a user interface for creating a content rule.

DETAILED DESCRIPTION

Figure 2:
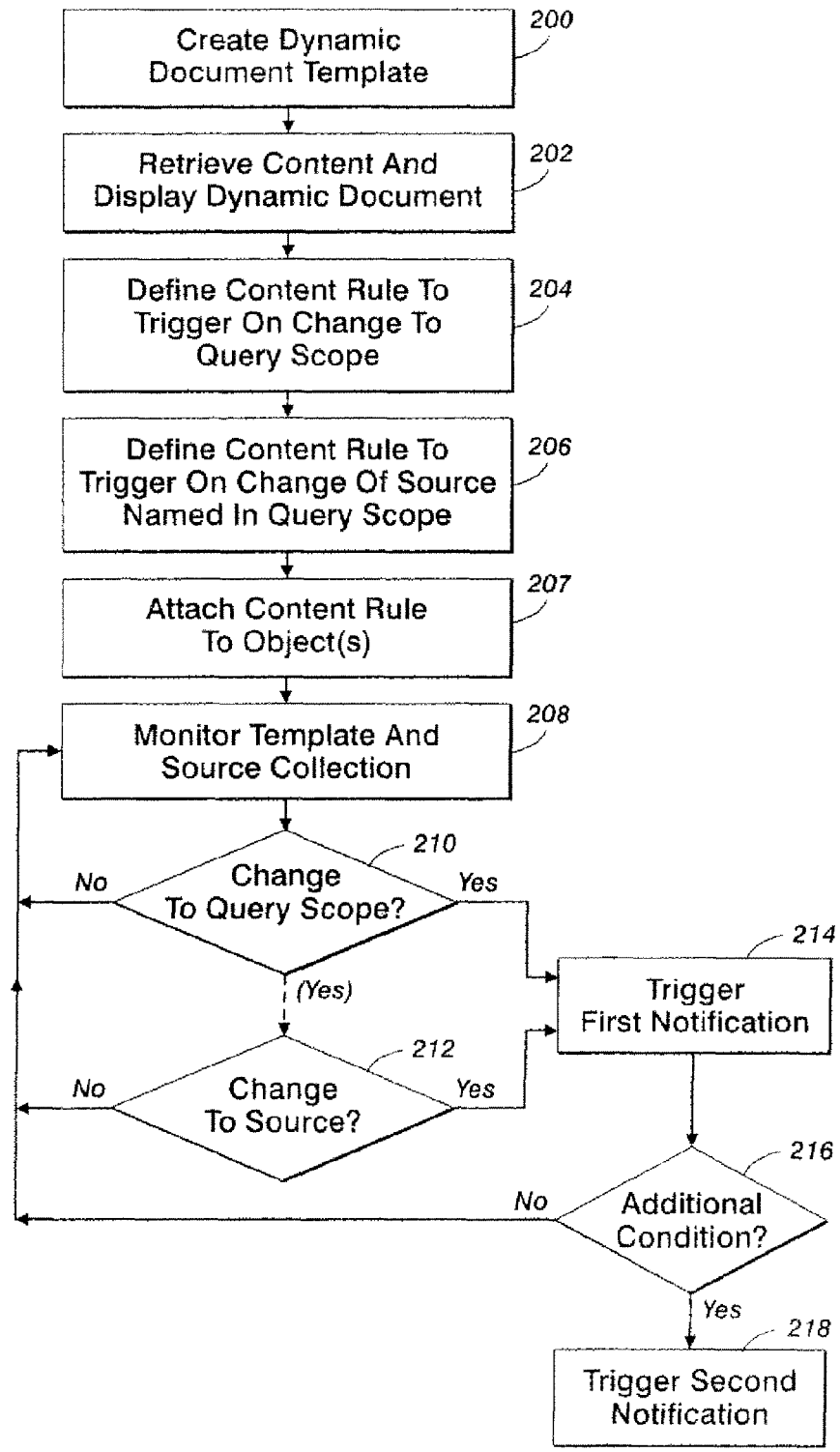
FIG. 2 depicts a flowchart of one embodiment of a notification event in a dynamic document system.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

The disclosed embodiments relate to a dynamic document system and method. In one embodiment, a dynamic document system may include, but is not limited to, a processor, a processor-readable storage medium in communication with the processor, and a communication network. The dynamic document system may include one or more dynamic document templates. FIG. 1 discloses one embodiment of a dynamic document template, here shown as a set of extensible markup language (XML) queries. A dynamic document template 100 is a set of computer-readable instructions to create one or more data fields containing a constraint for each data field. The constraints are used to determine what data belongs in the data field. A dynamic document template may be used to create a dynamic document using parts of one or more source documents. The dynamic document template may be a file or script containing code in a computer language such as, but not limited to, XML. A dynamic document template may reduce the necessary computer memory as the template is dynamically expanded to create the document. A dynamic document template may be used re-create a dynamic document when there is a change in source content.

A dynamic document template contains one or more queries. A query includes a query scope, a context element, and other elements that restrict or filter a query result. The query scope may include references to one or more document collections, or to one or more source documents that are maintained in a document collection. The context element of a query may refer to content, fields, or other subsections within such documents. The exemplary dynamic document template in FIG. 1 contains two queries 110, 120. However, any number of queries may be included. A query is a computer readable instruction that is used to retrieve a specified portion of a document into the template. Each query includes a context element 150, 155 and a query scope 130, 135. A query scope 130, 135 refers to one or more document collections; or one or more source documents maintained in a collection. A query scope may be used to provide one or more instructions to request information retrieval from a particular resource. A context element 150, 155 refers to a type or category of information within a source document, such as a title, name or predetermined content such as "mission" 155 as shown in FIG. 1. Optionally, a query may have additional elements that restrict the content retrieved by the scope and context elements.

A source document may be a structured or unstructured document. In one embodiment, a source document may be, but is not limited to, a spreadsheet, word processing document, letter, article, or electronic mail message. A source document may be a single document, a document collection, or multiple documents within a document collection. A collection may be stored in a processor readable storage medium, such as, but not limited to, a management information base.

A dynamic document template 100 may contain any number of queries, 110, 120. Each query may have different query scopes 130, 135 and may refer to different context elements 150, 155. Alternatively, one or more queries may refer to the same source document or group of documents.

In FIG. 1, the dynamic document template 100 contains queries 110, 120. The first query 110 contains a first action to extract the name context element 150 and its child elements (if it has any) from the documents within the query scope 130, which is Collection-20. The second query 120 contains a second action to extract the mission statement context element 155 and its child elements (if it has any) from the query scope 135, which is Document-34.

As an example, the template of FIG. 1 contains two queries, one query 110 with a collection scope and a context element containing "name" and one query 120 with a document scope and a context element containing "mission". Query 120 includes the following elements;

```
<cpxquery href="http://copper.wcrt.xeroxlabs.com:8280/docushare">
    <cpxscope>Document-34</cpxscope>
    <cpxcontext>mission</cpxcontext>
</cpxquery>
```

In an exemplary application, query 120 may use the following content from Document-34:

```
<charter>
    <vision> Our innovation in document management makes it easy for
    our customers to efficiently bring the worlds of information and
    documents together.
    </vision>
    <mission> To innovate, exploit and apply emerging technologies in
document management. </mission>
</charter>
``` to return the following xml fragment retrieved from Document-34:

```
<mission>To innovate, exploit and apply emerging technologies in
    document management.</mission>
``` which is inserted into the expanded template.

A dynamic document, as used herein, is a document created by a template as described above. A dynamic document may display at least a portion of the data fields established by the template, filled with the content of the source document that is associated with each data field's query scope and context element. Thus, a dynamic document includes sections taken from several documents that are maintained in one or more source collections.

FIG. 2 depicts a flowchart of one embodiment of a dynamic document monitoring and notification system. A dynamic document template may be created that contains one or more queries 200. In one embodiment, the queries can be applied to retrieve content from source documents in a document collection to display a dynamic document 202. Source document content is digital information associated with a source document. The content of a source document may include, but is not limited to, a figure, text, image, chart, graph, title, authorship, ownership, locking privileges, and other attributes and displays of a source document.

In one embodiment, a document template may be modified by multiple users. In such a situation, a modification created by one user may adversely affect other users because the modification may result in an invalid or changed query scope, or because the modification resulted in a change to the other elements of the template such as the context element. In addition, one or more documents in a document collection may be modified, and such modifications may cause the content referred to by a query scope to be changed. In such situations a user may define a content rule as a script, program or computer-implemented command to monitor instructions contained in a document template and establish a trigger if changes occur to a query scope 204. A user may also define a content rule to monitor content in a document or in a collection and establish a trigger if changes occur to that content 206. For example, referring back to FIG. 1, a user may revise a template 100 to include a query scope relating to Collection-20 130. The user may also define a content rule requiring that if a change occurs to that query scope, a trigger is established. The user also may define a content rule that is triggered by a change to the content of a content source named in a query scope. For example, the content rule may establish a trigger in the event that there is a deletion of any document within Collection-20, or it may look for changes to or deletions of specific documents, such as Document-34. The trigger also may be defined by more specific changes, such as changes to a context element within a particular document, such as a chance to a mission statement in Document-34 (see element 120 of FIG. 1). The triggers may be established in a single content rule, or multiple content rules may be established with multiple triggers.

Referring back to FIG. 2, the content rule may be associated with one or more objects and applied to monitor the template and the sources 208 to determine whether there are any changes to the query scope defined in the content rule 210, or whether there are any changes to the source collection, document or context elements defined in the content rule 212. If there is a change in either the query scope or the source, a notification may be triggered 214. The notification may be, for example, an email notifying one or more users that there is a change to a query scope or content that may require attention.

For example, referring again to FIG. 1, if a query scope refers to Collection-20 130 and a content rule is triggered upon identification of a change to Collection-20, the system may monitor the source collection and identify when documents are added to or removed from Collection-20. In the event that there is an addition to Collection-20, a notification may advise a user that the template should be refreshed to display content from the most recent documents in the collection. Alternatively, if the application of the content rule identifies that all documents in Collection-20 have been removed from the source database or that Collection-20 has been deleted, a notification may be sent notifying a user that the query scope is no longer valid and should be edited or deleted in the template.

In some embodiments, the user receiving the notification may be the same user, or an individual designated by the user, who created the query scope that is the subject of the content rule. In another embodiment, the notified user may be the creator of the content rule itself. In another embodiment, the notified user may be the end user of the dynamic document. As illustrated by the dashed lines in FIG. 2 indicating alternate embodiments, in one embodiment, a notification event may occur only if the change occurs to both the query scope and a source document.

Notification may occur by an e-mail, text message, instant message, or other form of electronic communication to be transmitted to a user. In another embodiment, notification may be in the form of computer animation which may include, but is not limited to, the use of a wizard to help the user take action.

In one embodiment, when a content rule's trigger event occurs, a notification event may occur only when a change in the source document satisfies an additional condition 216. The additional condition may be based on a specific change. In one embodiment, a content rule may state that a user should be notified when there is a specified change to the source document which includes, but not limited to, a new version created, a certain percentage of the document changed, a new owner, or that a document is locked. Also, the additional condition may be used to determine which users should be notified. For example, a trigger may result in a first notification to a first group of users, but a second group of users or a subset of the first set of users may receive a second notification 218 only if an additional condition 216 is satisfied.

For example, a content rule may be "If paragraph 4 changes in Document-34, then notify Fred." The additional condition may be "If there is a change in more than 25% of the content of paragraph 4 of Document-34, then also notify Wilma."

In addition, a content rule may define a trigger whenever a particular query scope or context element of a template query is modified. The content rule may identify such changes and trigger a notification, or take the next step of searching the source collection to confirm that the source document and context elements defined in the revised content rule exist. If the elements do exist, the notification may suggest that the user refresh the document template to create an updated dynamic document. Alternatively, if the search determines that the source document or context element does not exist, the system may notify the user that the revised query is invalid.

Accordingly, the use of content rules for a dynamic document enables the automatic monitoring of a dynamic document to determine whether any changes in the document template, as well as any changes in the underlying source documents and collections, require attention. The attention required may include, for example, revision to the document template because a query scope is invalid. Alternatively, the attention may include applying the document template to the source document or collection to produce an updated dynamic document that includes revised content that has been placed into the collection.

Figure 3:
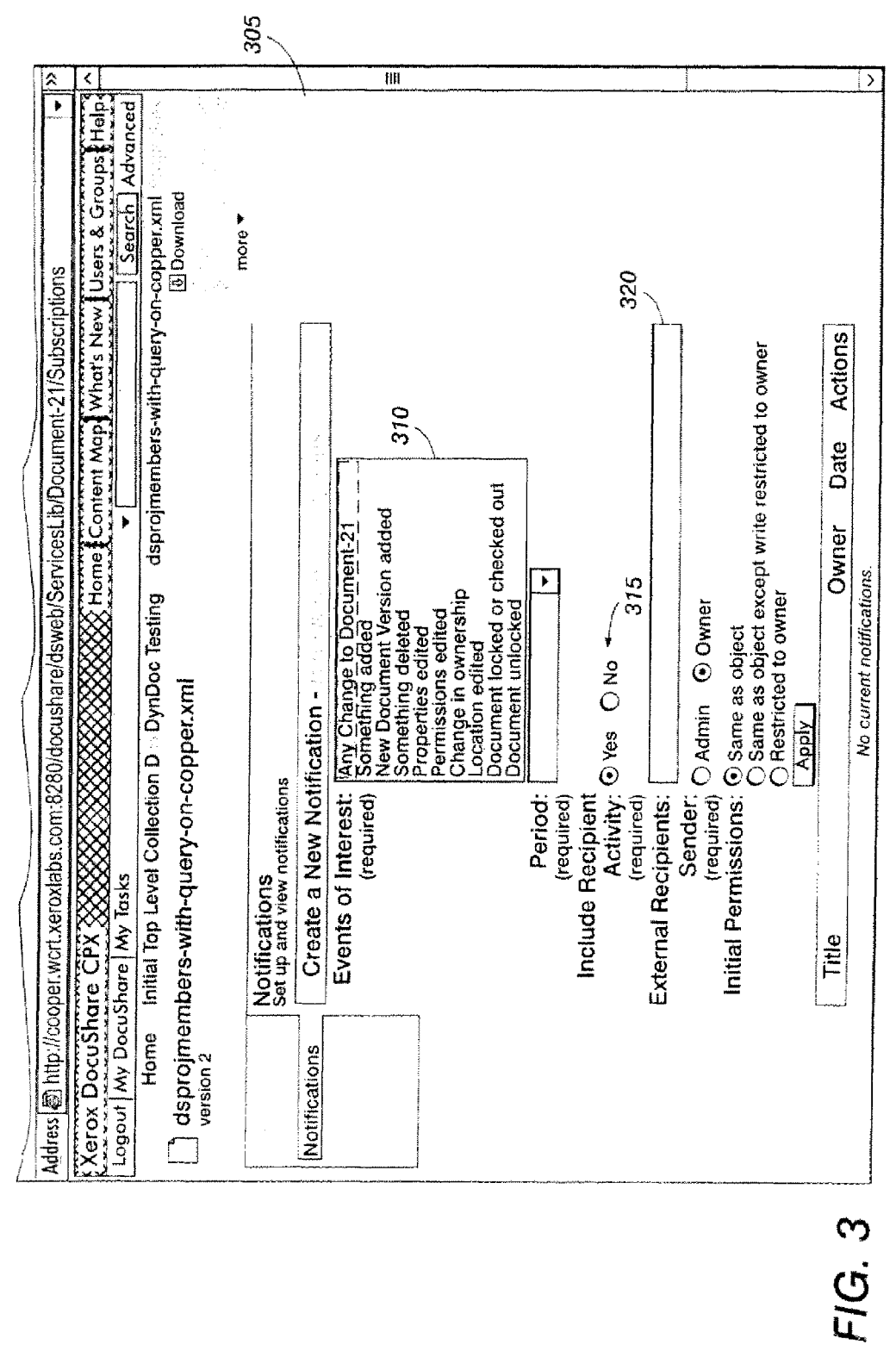

FIG. 3 depicts one embodiment of extending a user interface 305 for creating a content rule for a regular document so that the user interface can also be used for creating a content rule for a dynamic document that is associated with the dynamic document template. A user can specify a trigger event 310 for a content rule by choosing from one or more types of changes to the content of a source document, or changes to the template itself such as a change to a query scope. In one embodiment, the elements of content rules may be listed in a drop-down menu. In an alternative embodiment, the elements of content rules may be selectable by check boxes or other types of input devices allowing a user to choose from among alternatives. In another embodiment, the user may create and specify a content rule using a programming language. In addition to specifying the trigger event, a user may also specify who will receive notification 315, 320.

In one embodiment, the notification may inform the user that there has been a change to a source document or collection, or a change to a query scope in the template. In another embodiment, the notification may ask the user how to proceed. Alternatively, the notification may suggest a way to proceed.

In one embodiment, a notification can alert a user that a source document that is referred to in a query scope has been revised. The user can then refresh the dynamic document to include the new content by using the document template engine to retrieve any new content from the source document into the dynamic document.

In one embodiment, a source document may be edited such that a query scope is no longer valid. For example, a query scope may refer to Document-34, but if Document-34 has been deleted from the collection, the user may be notified that the template may no longer be valid and should be edited. In another embodiment, Document-34 may have been edited so that the query scope refers to a context element that does not exist in Document-34. If the applicable content of source document Document-34 does not exist, the query scope may no longer be valid, and the user should be notified.

Figure 4:
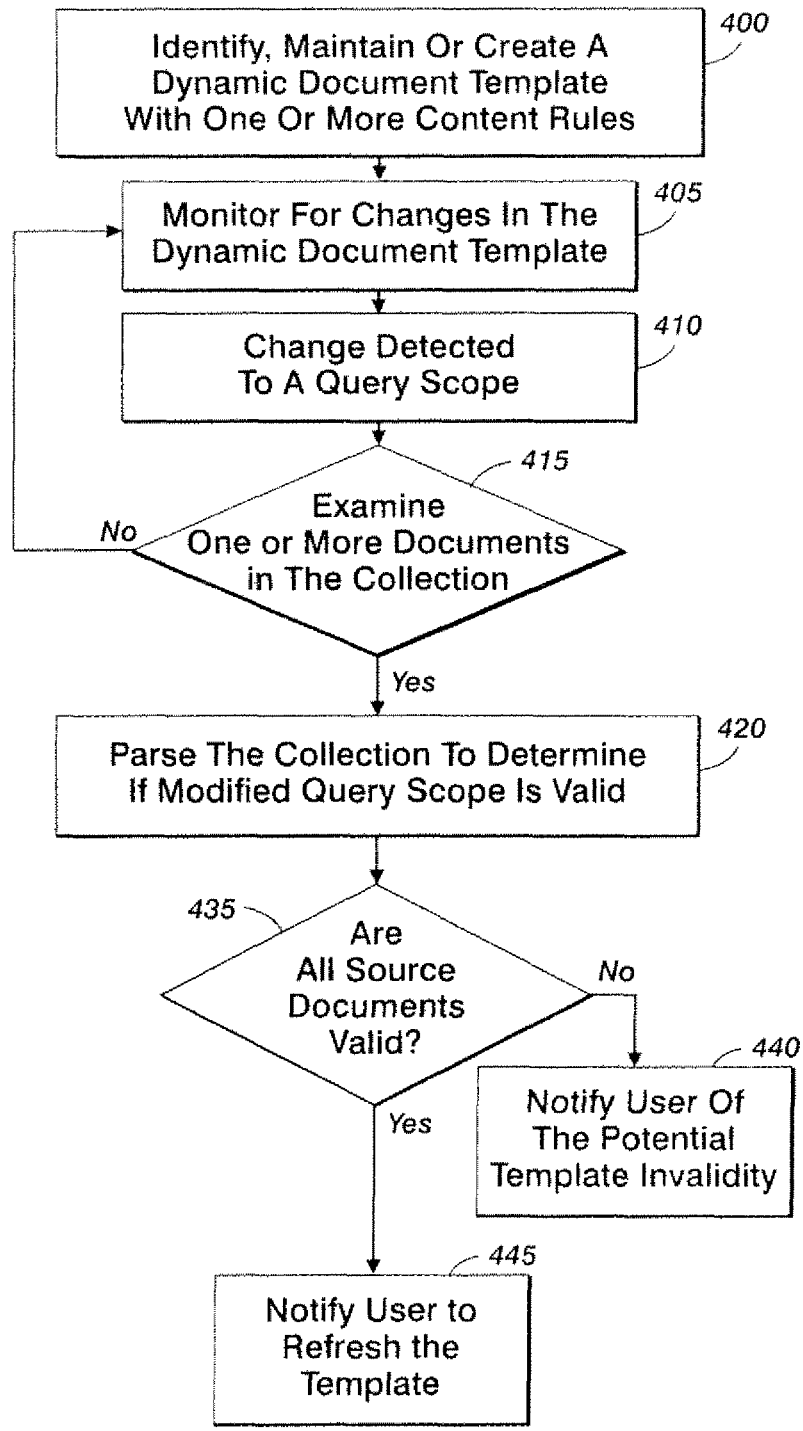
FIG. 4 depicts a flowchart of one embodiment of a change in a dynamic dynamic document template.

In an alternate embodiment, a modification may occur to the dynamic document template. FIG. 4 depicts a flowchart of one embodiment of a change in a dynamic document template. In FIG. 4, a dynamic document template may have one or more content rules associated with it 400. The rules cause the system to monitor for changes in the template 405. Changes to the dynamic document template may include removing or otherwise modifying at least a portion of a query scope. Modifying a query scope includes, but is not limited to, changing a reference to a valid document or a valid collection. If the edits refer to a document or collection that does not exist, the editor of the template may be notified. Once the change to the query scope is detected 410, the system may further examine the source document or source collection of documents referred to by the updated scope 415. If the system examines the source documents, the documents may be parsed to determine if the query context is valid 420. i.e. occurs in any of the sources. If a query has been changed to refer to scope or context elements that do not exist or are invalid 435, a user may be notified of the potential invalidity of the template 440. If the scope or context elements are valid 435 a user may be notified to refresh the template 445.

For example, the template may include a query to find "the abstract sections of all documents in collection 1." If the query scope was modified resulting in the query to find "the abstract sections of all documents in collection 2," the query scope may no longer be valid as the documents in collection 2 may not contain abstract sections, or collection 2 may not exist at all. Therefore, the query scope—indeed, the template itself—may be invalid and the user may be notified.

Figure 5:
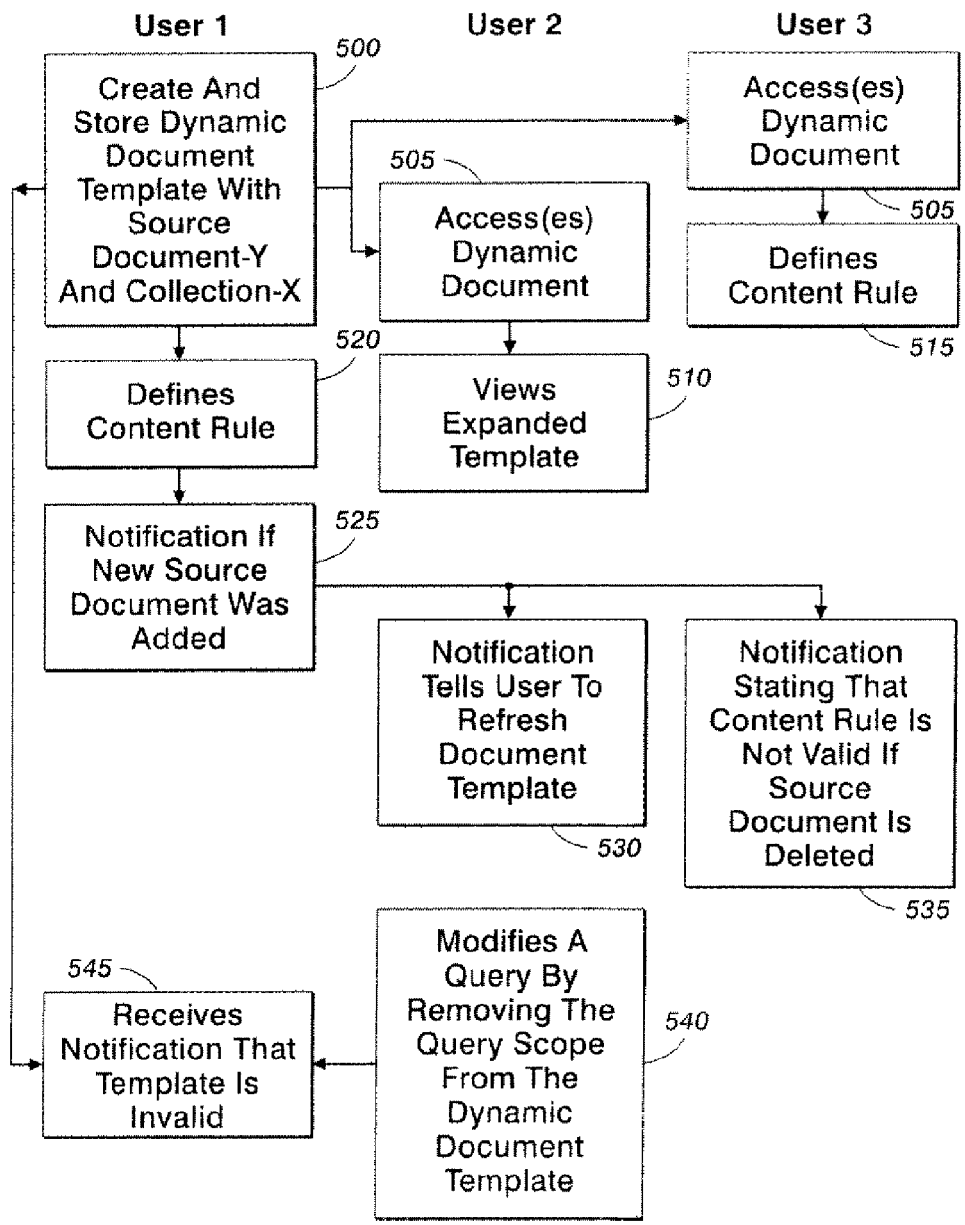
FIG. 5 depicts a flowchart of one embodiment of a method that supports content rules for dynamic documents.

FIG. 5 depicts a flowchart of one embodiment of a method of using a dynamic document notification system. The users of the dynamic document system may be using the system at different times or they may use the system simultaneously. User1 may create a dynamic document template. The dynamic document template may refer to Document-Y and Collection-X as the source documents 500. User1 may store the dynamic document template in memory.

User2 may access the dynamic document template 505. User2 may view the expanded dynamic document template using the dynamic document template engine 510. The engine may retrieve the content, based on queries, from the source document. The engine may also display the expanded dynamic document template with the most recent content retrieved from the repository.

User3 may access the dynamic document template in the repository 505 and may define a content rule 515. During the rule definition, the repository may list the source documents defined in the dynamic document template. User1 may define a content rule to be based on any changes to the content of Document-Y and/or Collection-X 520. The content rule may determine if there have been any changes to the content of Document-Y and/or (Collection-X which trigger a notification event.

If any changes to the content occur, a notification may be sent. In one embodiment, if there is a change to the content of Collection-X due to the addition of a new source document to the source document collection, Collection-X, then a notification may be sent to User2 525. The notification will tell User2 that the dynamic document template may be refreshed to obtain the most recent expansion due to a possible change of the source document content 530. User2 may access the dynamic document template and view the expanded dynamic document template using the dynamic document template engine.

In one embodiment, during the content rule definition, the repository automatically may define a rule regarding deletions of Document-Y or Collection-X. If any deletions to the content of Document-Y and/or Collection-X occur, a notification may be sent to User3 stating that the content rule, created by User3, may no longer be accurate and should be edited or deleted 535. For example, in one embodiment, User4 may delete Document-Y from the repository. If this occurs, the repository may automatically send a notification to User3. The notification may state that the content rule, which User3 defined, is no longer valid.

In one embodiment, User2 may modify a query by removing the query scope in the dynamic document template 540. As a result, the system may parse the template to determine if the query scope is included in other queries in the template. If the query scope is not in the template and the system searches the source documents and determines that the query is not valid, User1 may be notified 545.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
   maintaining, in a processor-readable storage medium, a dynamic document template containing a plurality of queries, wherein each query includes a query scope and a context element, wherein the query scope refers to one or more source documents maintained in a document collection and the context element refers to content of the one or more source documents referred to by the query scope;
   defining, based upon a request received from a first user, a first content rule and a second content rule;
   applying the first content rule to monitor the document template and trigger an action if a second user changes the document template;
   applying the second content rule to monitor the document collection and trigger an action if a second user changes any of the source documents referred to by the query scope;
   in response to both the first content rule and the second content rule triggering an action indicating a change occurred to the document template and at least one of the source documents, determining whether the query scope and context element of each of the queries in the document template are valid;
   indicating, in response to determining a valid query scope and context element, a query to be valid;
   if any of the queries are invalid after the change, issuing a notification to the first user indicating an invalid query;
   receiving a change to one of the queries to result in a modified query;
   automatically accessing the document collection to determine whether the modified query is valid; and
   if the modified query is valid, automatically refreshing the document template, wherein refreshing the document template comprises displaying a dynamic document comprising at least a portion of the dynamic document template with the content of the one or more source documents, including the changed source document.

2. The method of claim 1, further comprising, if all of the queries are valid after the change, notifying the user that the document template should be refreshed.

3. The method of claim 1, further comprising, if all of the queries are valid after the change, automatically refreshing the document template, wherein refreshing the document template comprises displaying a dynamic document comprising at least a portion of the dynamic document template with the content of the one or more source documents, including the changed source document.

4. The method of claim 1, further comprising:
   receiving a change to one of the queries to result in a modified query;
   automatically accessing the document collection to determine whether the modified query is valid;
   if the modified query is invalid, notifying a user that the document template may be invalid.

5. The method of claim 1 wherein notifying a user comprises identifying a user who selected the first or second content rule, and delivering a notification to the user who selected the first or second content rule.

6. The method of claim 1, further comprising:
   displaying a dynamic document, wherein the dynamic document comprises at least a portion of the dynamic document template and content from the source documents.

7. The method of claim 1, further comprising:
   determining whether the change satisfies a predetermined condition; and
   if the change satisfies a predetermined condition, triggering a second notification event.

8. A method of creating an electronic document, comprising:
   maintaining, in a processor-readable storage medium, a dynamic document template containing a plurality of queries, wherein each query includes a query scope and a context element, wherein the query scope refers to one or more source documents maintained in a document collection and the context element refers to content of the one or more source documents referred to by the query scope;

defining, based upon a request received from a first user, a first content rule and a second content rule;

applying the first content rule to monitor the document template and trigger an action if a second user changes the document template;

applying the second content rule to monitor the document collection and trigger an action if a second user changes any of the source documents referred to by the query scope;

in response to both the first content rule and the second content rule triggering an action indicating a change occurred to the document template and at least one of the source documents, determining whether the query scope and context element of each of the queries in the document template are valid;

indicating, in response to determining a valid query scope and context element, a query to be valid;

if any of the queries are invalid after the change, issuing a notification to the first user indicating an invalid query;

determining whether the change satisfies a predetermined condition;

if the change satisfies a predetermined condition, triggering a second notification event;

receiving a change to one of the queries to result in a modified query;

automatically accessing the document collection to determine whether the modified query is valid; and if the modified query is valid, automatically refreshing the document template, wherein refreshing the document template comprises displaying a dynamic document comprising at least a portion of the dynamic document template with the content of the one or more source documents, including the changed source document.

9. The method of claim 8, further comprising, if all of the queries are valid after the change, notifying the user that the document template should be refreshed.

10. The method of claim 8, further comprising, if all of the queries are valid after the change, automatically refreshing the document template, wherein refreshing the document template comprises displaying a dynamic document comprising at least a portion of the dynamic document template with the content of the one or more source documents, including the changed source document.

11. The method of claim 8, further comprising:
displaying a dynamic document comprising at least a portion of the dynamic document template with the content of the one or more source documents.

12. The method of claim 8, further comprising:
receiving a change to one of the queries to result in a modified query;
automatically accessing the document collection to determine whether the modified query is valid;
if the modified query is invalid, notifying a user that the document template may be invalid.

13. The method of claim 8, wherein notifying a user comprises identifying a user who selected the first or second content rule, and delivering a notification to the user who selected the first or second content rule.

14. The method of claim 8, further comprising:
displaying a dynamic document, wherein the dynamic document comprises at least a portion of the dynamic document template and content from the source documents.

15. A method of creating an electronic document, comprising:
maintaining, in a processor-readable storage medium, a dynamic document template containing a plurality of queries, wherein each query includes a query scope and a context element, wherein the query scope refers to one or more source documents maintained in a document collection and the context element refers to content of the one or more source documents referred to by the query scope;

defining, based upon a request received from a first user, a first content rule and a second content rule;

applying the first content rule to monitor the document template and trigger an action if a second user changes the document template;

applying the second content rule to monitor the document collection and trigger an action if a second user changes any of the source documents referred to by the query scope;

in response to both the first content rule and the second content rule triggering an action indicating a change to the document template and at least one of the source documents, determining whether the query scope and context element of each of the queries in the document template are valid;

indicating, in response to determining a valid query scope and context element, a query to be valid;

if any of the queries are invalid after the change, issuing a notification to the first user indicating an invalid query;

receiving a modification to one of the queries to result in a modified query;

automatically accessing the document collection to determine whether the modified query is valid;

if the modified query is valid, triggering a template refresh event; and displaying a dynamic document, wherein the dynamic document comprises at least a portion of the dynamic document template and content from the source documents.

16. The method of claim 15, wherein the template refresh event comprises notifying a user that the template may be invalid or automatically refreshing the template.

17. The method of claim 15, further comprising:
determining whether the change satisfies a predetermined condition; and
if the change satisfies a predetermined condition, triggering a second notification event.

* * * * *